United States Patent [19]

Nemoto et al.

[11] Patent Number: 4,812,937
[45] Date of Patent: Mar. 14, 1989

[54] MAGNETIC DISK CARTRIDGE WITH IMPROVED CENTER PLATE FOR DISK MOUNTING

[75] Inventors: Tsuneo Nemoto; Mika Kaneko, both of Miyagi, Japan

[73] Assignee: Sony Corporation, Tokyo, Japan

[21] Appl. No.: 212,025

[22] Filed: Jun. 23, 1988

Related U.S. Application Data

[63] Continuation of Ser. No. 909,469, Sep. 19, 1986, abandoned.

[30] Foreign Application Priority Data

Sep. 25, 1985 [JP] Japan .............................. 60-211976

[51] Int. Cl.$^4$ ............................................ G11B 23/03
[52] U.S. Cl. ..................................................... 360/133
[58] Field of Search ................ 360/133; 206/444, 312; 369/291, 261, 270, 271

[56] References Cited

U.S. PATENT DOCUMENTS

| | | | |
|---|---|---|---|
| 4,194,228 | 3/1980 | Duff ............................ | 206/444 X |
| 4,445,157 | 4/1984 | Takahashi .................... | 360/133 |
| 4,535,434 | 8/1985 | Kishi ........................... | 369/291 X |
| 4,571,718 | 2/1986 | Cahill et al. ................. | 360/133 X |
| 4,586,102 | 4/1986 | Bresson ....................... | 360/133 |
| 4,628,388 | 12/1986 | Kawabe ...................... | 360/133 X |
| 4,695,910 | 9/1987 | Maruyama et al. .......... | 360/133 |

FOREIGN PATENT DOCUMENTS

| | | |
|---|---|---|
| 2102188 | 6/1982 | United Kingdom . |
| 2127206 | 9/1983 | United Kingdom . |
| 2163887 | 8/1985 | United Kingdom . |

OTHER PUBLICATIONS

"Research Disclosure", Aug. 1984, pp. 378–379.

*Primary Examiner*—Robert S. Tupper
*Assistant Examiner*—Andrew S. Sniezek
*Attorney, Agent, or Firm*—Lewis H. Eslinger; Jay H. Maioli

[57] ABSTRACT

In a disk cartridge in which a sheet-like recording medium is fixed to the periphery of a circular center plate which has an approximately square center hole and an almost rectangular eccentric driving hole, and a cartridge rotatably accommodating the sheet-like recording medium and including an upper half and a lower half having a turntable insertion hole in which the circular center plate is loosely fitted; the sheet-like recording medium is positioned in the cartridge by restricting the movement of the circular center plate at the central portion thereof, so that the diameter of the circular center plate can be substantially decreased and aberration of tracking or the like during recording or reproducing is avoided as much as possible.

2 Claims, 6 Drawing Sheets

MAGNETIC DISK CARTRIDGE WITH IMPROVED CENTER PLATE FOR DISK MOUNTING

This is a continuation of application Ser. No. 909,469, filed 9/19/86 now abandoned.

BACKGROUND OF THE INVENTION

1. Field of the Invention

This invention relates to a disk cartridge comprising a cartridge or casing and a sheet-like recording medium which is rotatably accommodated in the cartridge and fixed to the periphery of a circular center plate, and more particularly is applied to a disk cartridge including a micro floppy disk, for example, a circular magnetic sheet having a diameter of 3.5 inches.

2. Description of the Prior Art

FIGS. 1 to 3 show a conventional disk cartridge including a micro floppy disk and a driving device for rotating the micro floppy disk.

As illustrated in FIGS. 1 and 2, a floppy disk 1 (simply described as a "disk" hereinafter) comprises a circular center plate 2 of stainless steel or the like and a magnetic sheet 3, namely, a sheet-like recording medium having a diameter of 3.5 inches and fixed to the periphery of the circular center plate 2. Center plate 2 is formed with an approximately square center hole 4 and an almost rectangular eccentric driving hole 5 which is arranged with its sides at a predetermined angle to the sides of center hole 4.

The disk 1 is rotatably accommodated in a casing or cartridge 8 comprising an upper half 6 and a lower half 7 which are made of synthetic resin, and the circular center plate 2 is loosely fitted in a turntable insertion hole 9 which is provided in the center portion of the lower half 7. A pair of upper and lower head insertion or access holes 10 are provided in the respective upper and lower halves 6 and 7 and elongated in a radial direction of the magnetic sheet 3. A shutter 11 is slidable along cartridge 8 between positions in which access holes 10 are closed and opened, respectively.

The driving device is disposed in a disk player (not shown) and comprises a turntable 15 which is so fixed to the upper end portion of the shaft 14 of a motor 13 as to be horizontally rotated. A magnetic chuck 18 comprising a yoke 16 and a magnetic plate 17 is secured to the upper side of the turntable 15 with screws 20 through a spacer 19, and a thin slippery sheet 21 of nonmagnetic material is adhered to the center portion of the upper face of the magnetic chuck 18. Furthermore, a center pin or spindle 22, namely, the distal end of the motor shaft 14 projects upwards from the magnetic chuck 18 in the center portion thereof, and a driving pin 23 is spaced radially from the center of the magnetic chuck 18. The driving pin 23 is secured to a leaf spring 24 sandwiched in between the magnetic plate 17 and the spacer 19, and the driving pin 23 projects upwards from the magnetic chuck 18 through a hole 25 thereof.

As shown in FIG. 1, when the cartridge 8 is horizontally mounted on the turntable 15 with the shutter 11 opened, the magnetic chuck 18 is inserted in the turntable insertion hole 9 as shown in FIG. 2, and the circular center plate 2 of the disk 1 is attracted by the magnetic force generated by the magnetic chuck 18 and horizontally located on the slippery sheet 21. Simultaneously, the center pin 22 and the driving pin 23 of the turntable 15 are fitted into the square center hole 4 and the eccentric driving hole 5, respectively, of the circular center plate 2. As shown in FIG. 3, a pair of upper and lower magnetic heads 26 and 27 are inserted in the respective access holes 10 and come in contact with the upper and lower faces, respectively, of the magnetic sheet 3 of the disk 1.

When the motor 13 is started after the disk 1 is loaded and the turntable 15 is rotated, the circular center plate 2 is positioned by the help of the center pin 22 and the torque for rotating the circular center plate 2 is transmitted through the driving pin 23, so that the magnetic sheet 3 is horizontally rotated in the cartridge 8. Therefore, when the magnetic heads 26 and 27 are moved in the radial direction of the magnetic sheet 3, recording or reproducing is selectively performed on one of opposed faces of the magnetic sheet 3.

It will be noted that the circular center plate 2 is so formed or pressed as to have a cylindrical portion 28 between a depressed major portion and a flange portion 29 which extends radially out from the cylindrical portion 28 as shown in FIG. 3. A round hole 30 provided in the center portion of the magnetic sheet 3 to receive the depressed major portion of plate 2 and the edge of hole 30 engages the outer periphery of the cylinder portion 28 so as to make the center of the magnetic sheet 3 coincide with the center of the circular center plate 2, and then the annular portion 3a of sheet 3 extending around the circular hole 30 is adhered to the lower face of the flange portion 29 by means of an adhesive 31.

Furthermore, a ring-like locating rib 32 having a large diameter $D_1$ depends integrally from the upper half 6 at the center portion of the inner face thereof as shown in FIG. 3 and extends within the inner periphery of the cylindrical portion 28 of the circular center plate 2 so as to loosely position the magnetic sheet 3 in the cartridge 8 and thereby ensure that the magnetic sheet 3 cannot move horizontally within the cartridge 8 to the extent that would cause the edge of the magnetic sheet to come in contact with the wall of the cartridge 8 and be damaged thereby. The top of the center pin 22 of the turntable 15 abuts against a low friction or slippery sheet 33 which is adhered to the inner face of the upper half 6 as shown in FIG. 3.

However, fluctuations in the thickness of the layer of adhesive 31, with which the portion 3a around the round hole 30 of the magnetic sheet 3 is adhered to the lower face of the flange portion 29 of the circular center plate 2 as shown in FIG. 3, or other reasons, may cause a height difference $H_1$ to arise between the lower face 3b of the portion 3a around the round hole 30 and the upper face 27a of the lower magnetic head 27, which functions as a standard to determine the height of the magnetic sheet 3. By reason of that height difference $H_1$, the horizontal upper face 27a of the lower magnetic head 27 is not at the level of magnetic sheet 3 when the latter is in its normally flat condition and, therefore, a deflection is generated in the radius direction of the magnetic sheet 3, so that defective or poor contacts are made between the magnetic heads 26, 27 and the magnetic sheet 3. Such bad contacts particularly occur when the magnetic heads 26, 27 are moved to a position $P_1$ where the magnetic heads 26, 27 are closest to the center of the circular center plate 2 for recording or reproducing.

Since the portion 3a around the round hole 30 of the magnetic sheet 3 is fixed with the adhesive 31 to the lower face of the flange portion 29 of the circular center plate 2, it becomes more difficult to deflect the magnetic sheet 3 as the magnetic heads 26, 27 approach the flange portion 29 of the circular center plate 2 and the contact condition between the magnetic heads 26, 27 and the magnetic sheet 3 deteriorates as the magnetic heads 26,27 near the position $P_1$. As a result, troubles arise, such as, tracking errors and dropouts. Such troubles are particularly noted in the case of a disk for high density recording, which has a capacity of two mega bytes, as compared with the disk for standard recording, which has a capacity of 1 mega bytes.

Therefore, if the diameter $D_2$ of the circular center plate 2 can be reduced in relation to the diameter $D_3$ (=3.5 inches) of the magnetic sheet 3, the contacts of the heads 26,27 with the sheet 3 are improved, because the distance $l_1$ between the radially innermost of position $P_1$ the magnetic heads 26, 27 and the position $P_2$ which coincides with the outer edge of the fixed portion 3a around the round hole 30 of the magnetic sheet 3, is made large enough. However, reducing the diameter $D_2$ is not simply accomplished.

The foregoing results from the fact that, in the conventional disk, the locating rig 32 having the large diameter $D_1$ integrally formed with the upper half 6 is disposed within the inner periphery of the cylindrical portion 28 of the circular center plate 2 so as to position the magnetic sheet 3 in the cartridge 8, so that it is difficult to reduce the diameter $D_2$ of the circular center plate 2 below a predetermined value. Thus, the diameter $D_2$ of the circular center plate 2 remains large in relation to the diameter $D_3$ of the magnetic sheet 3.

OBJECTS AND SUMMARY OF THE INVENTION

Accordingly, it is an object of the present invention to provide a disk cartridge in which the diameter of a circular center plate can be made relatively small in relation to the diameter of a recording medium, such as, the magnetic sheet or the like, while still restricting the movement of the circular center plate so as to avoid damaging contact of the outer edge of the recording medium with the inner surface of the cartridge.

A further object of the invention is to provide a disk cartridge in which contacts of recording and/or reproducing heads, such as magnetic heads or the like, with a sheet-like recording medium at the time of recording or reproducing are substantially improved so as to avoid tracking errors and dropouts.

Still another object of the invention is to provide a disk cartridge best suited for high density recording, for example, a micro floppy disk having a capacity of two mega bytes.

Still another object of the invention is to provide a disk cartridge in which the stability of a circular center plate on a turntable can be secured, even though the diameter of the circular center plate is reduced.

Still another object of the invention is to provide a disk cartridge in which the area of a sheet-like recording meidum at which the latter is adhered to the flange portion of a circular center plate can be made large enough, even though the diameter of the circular center plate is reduced.

Still another object of the invention is to provide a disk cartridge in which a ring having a relatively small diameter and being formed coaxially and in surrounding relation with a center hole of a circular center plate is employed to position a sheet-like recording medium in a cartridge, and can be simply made of synthetic resin by outsert molding.

Still another object of the invention is to provide a disk cartridge in which a ring having a small diameter, made of synthetic resin, and formed by outsert molding so as to surround a center hole of a circular center plate, can be attached very securely to the circular center plate.

DETAILED DESCRIPTION OF PREFERRED EMBODIMENTS

Figure 1:
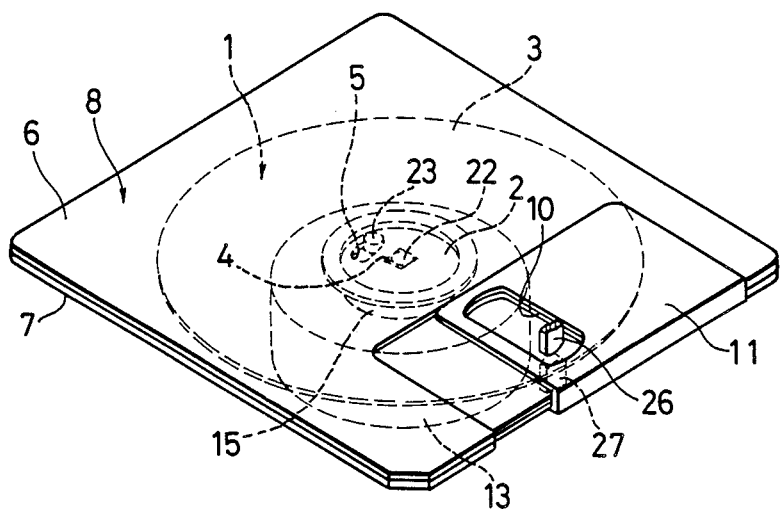
FIG. 1 is a perspective view of a conventional disk cartridge.
Figure 2:
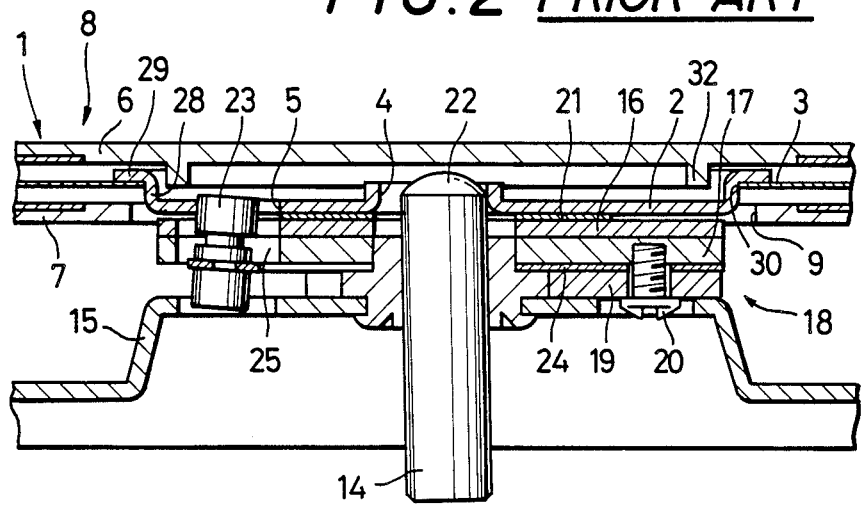
FIG. 2 is a fragmentary, enlarged sectional side view of the principal portion of the disk cartridge of FIG. 1.

A disc cartridge according to the invention and including a micro-floppy disk will now be described in detail with reference to FIGS. 4 and 5, in which, parts corresponding to those shown in FIGS. 1-3 will be denoted by the same reference numerals and will not be further described.

A circular center plate 36 of a disk 1 is made of metal, such as stainless steel or the like. A ring 37 having a relatively small outer diameter $D_4$ and being made of synthetic resin, such as ABS resin or the like, is formed integrally, as by outsert molding, with a wall or flange projecting upwards from the circular center plate 36 and forming a center hole 4 of almost square shape with which the ring 37 is coaxial. In the upwardly projecting wall of the circular center plate 36, there is provided a joining portion 46, such as a hole or recess, so as to make the ring 37 adhere to the circular center plate 36 as firmly and securely as possible.

Furthermore, a flange 38 also made of synthetic resin, such as ABS resin or the like, is formed integrally, as by outsert molding, with the circular center plate 36 at the outer edge thereof as to project upwards from the circular center plate 36 and extend horizontally outward therefrom. A round hole 40 provided in the center portion of a sheet-like recording medium, namely, a magnetic sheet 39 having a diameter of 3.5 inches engages over the outer periphery of a cylindrical portion 38a which projects upwards from the flange 38 at the bottom thereof secured on center plate 36 so as to make the center of the magnetic sheet 39 coincide with the center of the circular center plate 36, and then a portion 39a of the recording medium extending around the round hole 40 of the magnetic sheet 39 is adhered to the upper face of the flange 38 with an adhesive 41 or the like.

The disk 1 is rotatably accommodated in a cartridge 44 comprising an upper half 42 and a lower half 43 and made of synthetic resin. The circular center plate 36 is loosely fitted in a turntable insertion hole 9 provided in the lower half 43. A cylindrical locating rib 45 having a small inside diameter $D_5$ ($>D_4$) is depends integrally from the center portion of the inner face of upper half 42. The ring 37 on the circular center plate 36 of the disk 1 having a small diameter $D_4$ is put within the inner periphery of the locating rib 45 having a small diameter $D_5$ so as to position the magnetic sheet 39 in the cartridge 44. Of course, the diameter of the locating rib 45 is determined so that the locating rib 45 should not interfere with the driving pin 23 of the turntable 15, and also, the inside diameter of the flange 38 is determined so that the flange 38 should not interfere with the eccentric hole 5 of the circular center plate 36.

Figure 4:
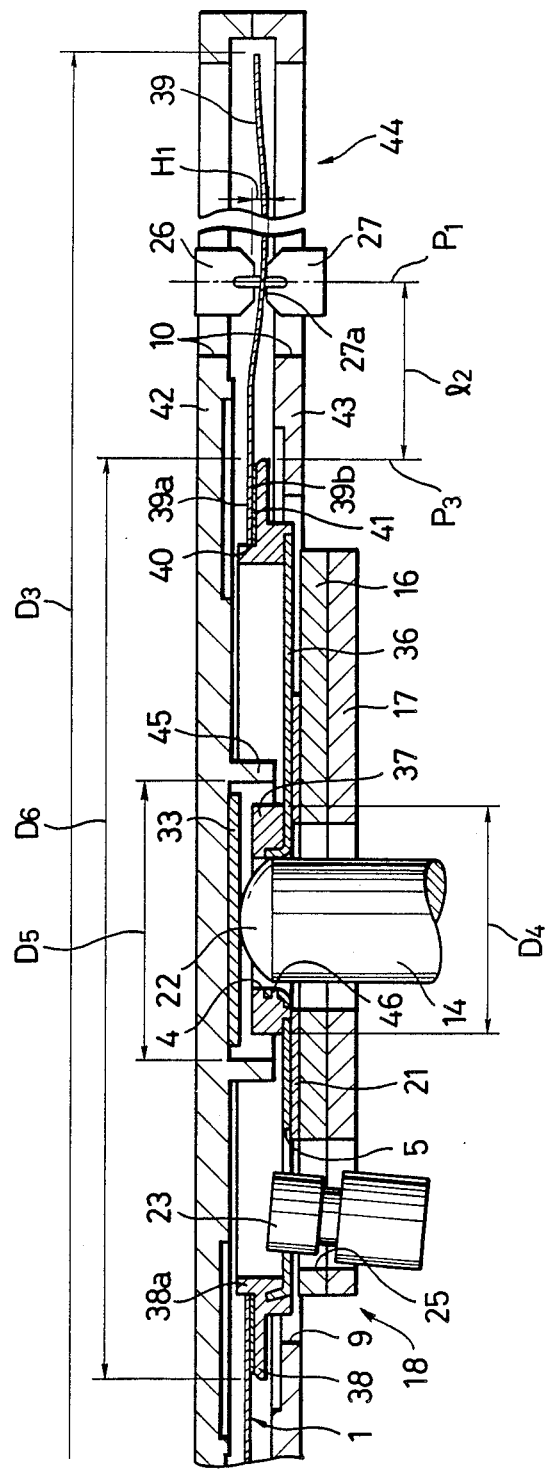
FIG. 4 is a sectional side view similar to that of FIG. 3, but of a disk cartridge according to an embodiment of this invention.
Figure 5:
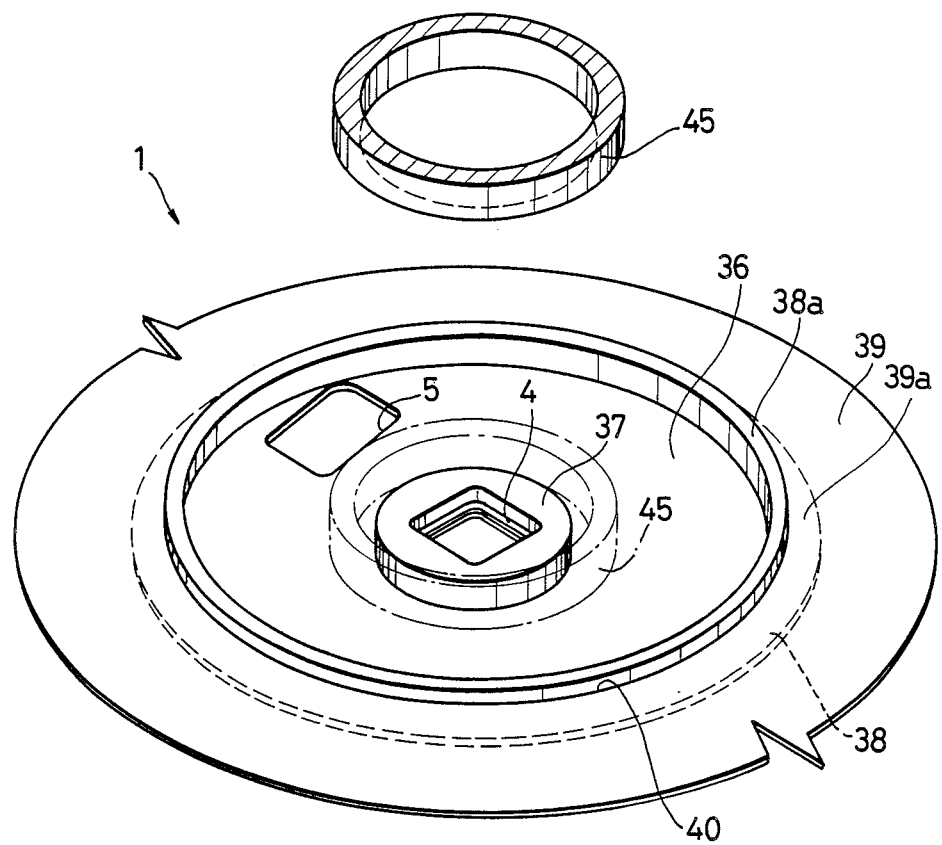
FIG. 5 is an exploded perspective view of the principal portion of the disk cartridge of FIG. 4.

In the embodiment of FIGS. 4 and 5, the ring 37 having the small diameter $D_4$ and adhered to the circular center plate 36 in the vicinity of the center thereof is disposed within the inner periphery of the locating rib 45 which has a relatively small inside diameter $D_5$ and is formed integrally with the upper half 42 of the cartridge on the inner face thereof so as to position the magnetic sheet 39 in the cartridge 44.

Therefore, as shown in FIG. 4, the diameter $D_6$ of the flange 38 can be reduced in relation to the diameter $D_3$ (=3.5 inches) of the magnetic sheet 39, for correspondingly increasing the distance $l_2$ between the outer edge $P_3$ of the fixed disk portion 39a extending around the round hole 40 of the circular center plate 36 and adhered to the flange 38 on the upper face thereof, and the position $P_1$ (the same as before), which is nearest the magnetic heads 26, 27 approach the center of the circular center plate 36 for recording or reproducing. In other words, $D_6$, $l_2$ shown in FIG. 4 and $D_2$, $l_1$ shown in FIG. 3, have the relations $D_2 > D_6$, so that $l_2$ is larger than $l_1$ by the difference between $D_2$ and $D_6$.

According to this invention, the contact condition of the magnetic sheet 39 with the magnetic heads 26 and 27 is much improved even when there exists the height difference $H_1$ between the lower face 38b of the portion 39a around the circular hole 40 of the magnetic sheet 39 and the upper face 27a of the lower magnetic head 27 that functions as a standard to determine the height of the magnetic sheet 39 due to, for example, fluctuation of the thickness of the adhesive layer, through which the disk portion 39a is adhered to the upper face of the flange 38 of the circular center plate 36, because the distance $l_2$ is made large enough. Thus, the tracking errors and dropouts are avoided.

Figure 6:
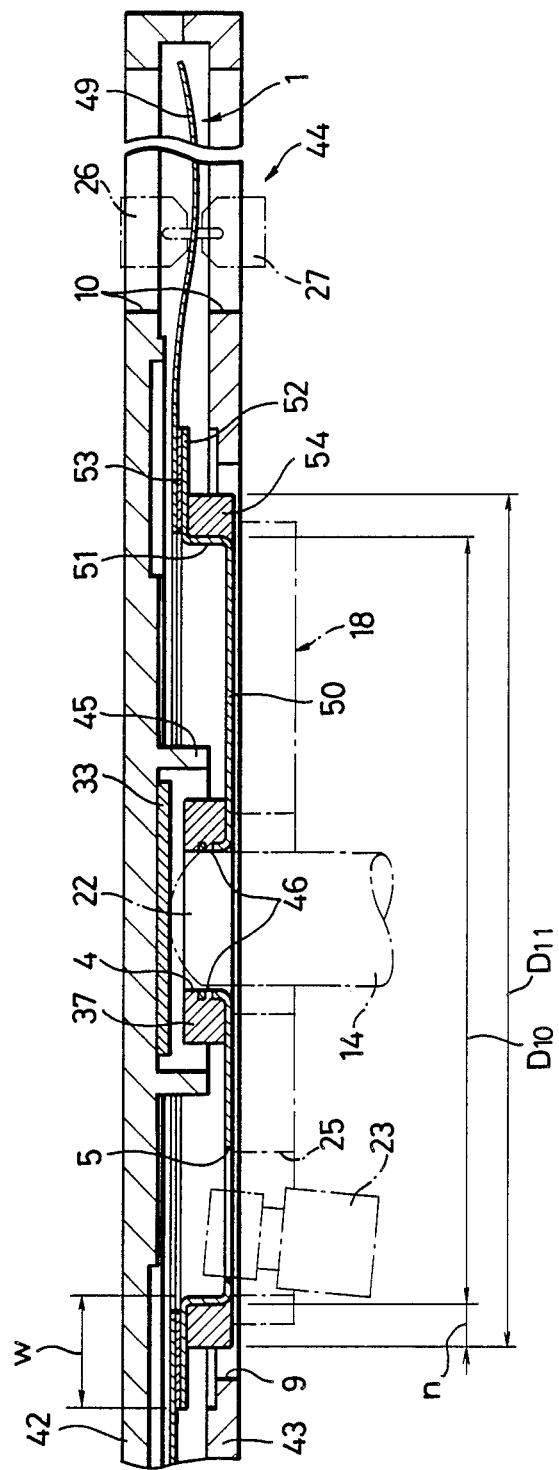
FIG. 6 is a sectional side view of a disk cartridge according to a second embodiment of this invention.
Figure 7:
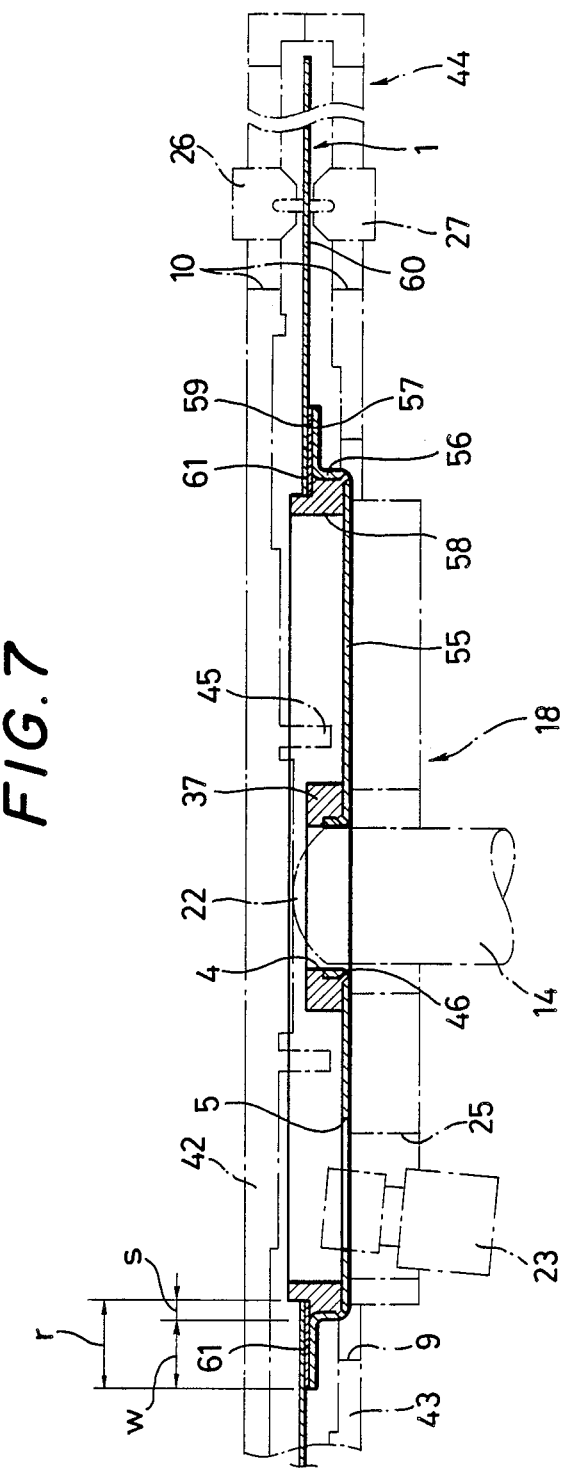
FIG. 7 is a sectional side view of a disk cartridge according to a third embodiment of this invention.

FIGS. 6 and 7 show other embodiments in which the portion of the circular center plate to which the magnetic sheet is is modified. In the following description, the parts corresponding to those shown in FIGS. 1 to 5 are denoted by the same reference numerals and further explanation therefor is omitted. Shown in FIG. 6 is a circular center plate 50 similar in appearance to the circular center plate 36 shown in FIG. 5. In the circular center plate 50, a cylindrical portion 51 thereof has a smaller diameter $D_{10}$, but the width w of a flange portion 52 thereof is the same as before, so that a magnetic sheet 49 can be adhered to the flange portion 52 of the circular center plate 50 by an adhesive 53. However, the stability of the circular center plate 50 on the turntable 15 is decreased as the diameter $D_{10}$ of the cylindrical portion 51 is reduced. Hence, a ring 54 of synthetic resin is formed on the periphery of the cylindrical portion 51 as by outsert molding, and has a width n and a diameter $D_{11}$ is provided so as to improve the stability of the circular center plate 50 on the turn table 15.

Figure 3:
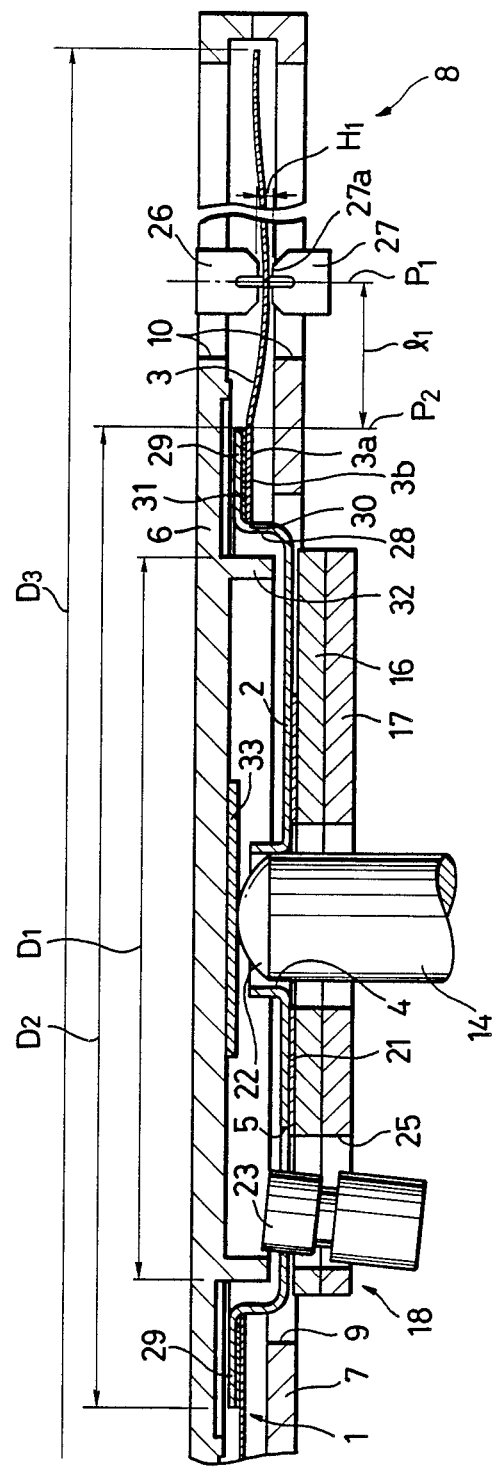
FIG. 3 is a further enlarged sectional view of the principal portion of the disk cartridge of FIG. 1.

In FIG. 7, the diameter of a cylindrical portion 56 of a circular center plate 55 is not decreased relative to the diameter of the cylindrical portion 28 in the prior art disk cartridge of FIG. 3. Instead, the width w of a flange portion 57 of the circular center plate 55 is decreased so as to reduce the overall diameter of the circular center plate 55. However, due to the narrow width w of the flange portion 57, the area at which the magnetic sheet 60 may be adhered to plate 55 is too small to make the magnetic sheet 60 secure to the circular center plate 55. Such being the case, a ring 58 of synthetic resin is formed integrally as by outsert molding, with the circular center plate 55 at the inner periphery of the cylindrical portion 56 thereof. The ring 58 is shown to define an annular surface of a radial width s which is an extension of the upper surface of flange 57. Therefore, the magnetic sheet 60 is adhered, at its portion 61 having a width r (=w+s) by an adhesive 59, so that the magnetic sheet 60 is securely attached to the circular center plate 55.

Although illustrative embodiments of the invention have been described in detail herein with reference to the accompanying drawings, it is to be understood the invention is not limited to such precise embodiments, and that various changes and modifications may be effected therein by one skilled in the art without departing from the scope or spirit of the invention. For example, the ring 37 is not necessarily formed by outsert molding as described in the embodiments. It can be secured to the circular center plate 36, 50 or 55 by means of adhesive, welds, screws or the like. Further, the sheet-like recording medium can be other than a magnetic sheet.

This invention applicable not only to a disk cartridge including a micro floppy disk but also to a disk cartridge including any other recording medium which is used for various types of recording or reproducing.

What is claimed is:

1. In a disk cartridge comprising a sheet-like, flexible recording medium fixed to the periphery of a circular center plate in which a substantially square center hole and a substantially rectangular eccentric driving hole are provided, and a cartridge rotatably accommodating the sheet-like, flexible recording medium and including an upper half and a lower half having a turntable insertion hole in which said circular center plate is loosely fitted; the improvement comprising a synthetic resin ring formed integrally and coaxially with said circular center plate on the upper side thereof and having a small diameter relative to said center plate so as to surround said substantially square center hole, said substantially square center hole of the circular center plate having an upstanding flange extending along the edge thereof and being formed with gaps into which said synthetic resin ring is molded so as to securely attach said synthetic resin ring to said circular center plate, said circular center plate further having a cylindrical portion proximate said periphery thereof, a stabilizing ring affixed to an outer surface of said cylindrical portion out of contact with said recording medium for providing rotational stability to said circular center plate, and a locating rib substantially concentric with said synthetic resin ring on said center plate and formed integrally with said upper half of the cartridge on the inside thereof and having a small diameter relative to said center plate and larger than the diameter of said synthetic resin ring so as to be located between said driving hole and said square center hole and having a height so as to depend around said synthetic resin ring for positioning said recording medium in said cartridge.

2. In a disk cartridge comprising a sheet-like, flexible recording medium fixed to the periphery of a circular center plate in which a substantially square center hole and a substantially rectangular eccentric driving hole are provided, and a cartridge rotatably accommodating the sheet-like, flexible recording medium and including an upper half and a lower half having a turntable insertion hole in which said circular center plate is loosely fitted; the improvement comprising: a synthetic resin ring formed integrally and coaxially with said circular center plate on the upper side thereof and having a small diameter relative to said center plate so as to surround said substantially square center hole, said center hole of the circular center plate having an upstanding flange extending along the edge thereof and formed with gaps into which said synthetic resin ring is molded so as to securely attach said ring to said circular plate, said circular center plate having a cylindrical portion at the periphery thereof, a mounting ring affixed to an inner surface of said cylindrical portion and having a flat surface to which said recording medium is also affixed, and a locating rib substantially concentric with said synthetic resin ring on said center plate and formed integrally with said upper half of the cartridge on the inside thereof and having a small diameter relative to said center plate and larger than the diameter of said synthetic resin ring so as to be located between said driving hole and said square center hole and having a height so as to depend around said synthetic resin ring for positioning said recording medium in said cartridge.

* * * * *